Aug. 21, 1945.    M. L. BENJAMIN ET AL    2,383,036
EXPANDING ARBOR
Filed Sept. 20, 1943

INVENTORS
MILTON L. BENJAMIN and
BY  STANLEY S. BENJAMIN

Oberlin, Limbach & Day.
ATTORNEYS

Patented Aug. 21, 1945

2,383,036

UNITED STATES PATENT OFFICE 2,383,036

EXPANDING ARBOR

Milton L. Benjamin, Cleveland, and Stanley S. Benjamin, University Heights, Ohio; said Stanley S. Benjamin assignor to said Milton L. Benjamin Application September 20, 1943, Serial No. 503,098

5 Claims. (Cl. 82—44)

The present invention relates to an expanding arbor or mandrel adapted to hold bored workpieces or tools while rotating the latter either for the purpose of machining the outside surfaces of a workpiece, or for performing a machining operation with the tool. Heretofore, expanding arbors have been of three general types, viz., the sliding shoe, the single cone and the opposed cone. In the sliding shoe type of expanding arbor, the gripping action of the workpiece is dependent upon the outward movement of a plurality of radially spaced shoes or keys which exert expanding pressure at localized points on the inner bore of the workpiece. In the single cone type of arbor, a split bushing is expanded outwardly by means of an interior, tapered plug or spindle, which requires considerable force to disassemble it from gripping engagement; and wherein greater expansive movement occurs on the outer end of the split bushing than at the inner ends, thus resulting in a non-uniform gripping of the inner bore of the workpiece. In the opposed cone type of expanding arbor, two axially movable conical surfaces having their apices pointing toward each other contact with opposite ends of a split bushing or sleeve, causing the expansion of the latter. Since the accuracy of alignment and of movement of the outer surface of the expanding sleeve is dependent upon the accuracy of alignment of the opposed cones and also of their individual surfaces, difficulties are encountered in maintaining a high degree of precision in such opposed cone type of expanding arbor.

The general object and nature of our present invention is to provide an expanding arbor in which the expanding sleeve is initially mounted upon the arbor shank in true and precise alignment and is subsequently moved to expanded, gripping position in a uniform manner and without disturbing the initial high degree of accuracy.

Briefly outlined, the expanding arbor involving the principle of our invention comprises a pair of spaced conical bearing surfaces which are integral with the shank of the arbor and whose apices extend in the same axial direction, together with an expanding sleeve also having conical surfaces engaging with such conical surfaces on the shank. Our invention also provides a spherical bearing surface for transmitting longitudinal pressure to the end of the expansible sleeve whereby such pressure upon the latter is applied in true alignment with the axis of the shank and thereby does not disturb the initial precise alignment of the sleeve during its expansive movement.

A further object and advantage of our invention is to provide means for preventing the transmission of torsional or twisting force to the expansible sleeve in order to prevent any distortion of the latter which might in turn tend to disturb the uniformity and precision of its workpiece or tool gripping action.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing—

Figure 1:
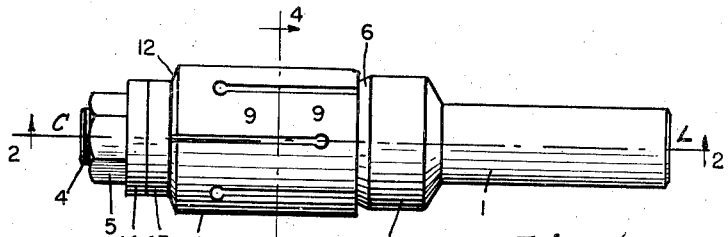
Fig. 1 is a plan view of an expanding arbor involving the principle of our invention.

Now referring more particularly to the drawing, the device shown therein comprises a shank 1 having a right-hand portion which can be suitably mounted in a machine tool chuck, or can be set up between head and tail stock centers through the medium of the drilled centering holes 2, 2 at each end of the shank 1. An integral collar 3 is located at the intermediate portion of the shank 1. The left-hand end of the shank 1 is threaded for engagement by the nut 5. A conical bearing surface 6 is provided on one side of the collar 3 and a similar conical bearing surface 7, but of smaller base diameter, is provided on the shank 1 in spaced relationship to the bearing surface 6. An expanding bushing or sleeve 8 of the collet type, in which alternate saw cuts or slits 9 project inwardly from opposite ends thereof, is adapted to fit over the shank 1 and upon expansion to grip the inner bore of the workpiece W, as indicated in dotted lines in Fig. 2.

The expansible sleeve 8 has an interior conical surface 10 which is complementary to, and adapted to, engage with the conical surface 6 on the shank 1. The sleeve 8 also has an interior conical surface 11 which is complementary to, and adapted to, engage with the conical surface 7. It will be noted that the conical surfaces 6, 7, 10 and 11 are disposed in the same relative direction with respect to the axis of the shank 1, or in other words, have their apices disposed in the same axial direction with respect to each other. Preferably, the conical surfaces 6, 10 are parallel to the conical surfaces 7, 11, so that equal outward expanding movement is exerted upon both the right and left-hand ends of the expanding sleeve 8 as the latter is forced longitudinally along these surfaces.

Figure 2:
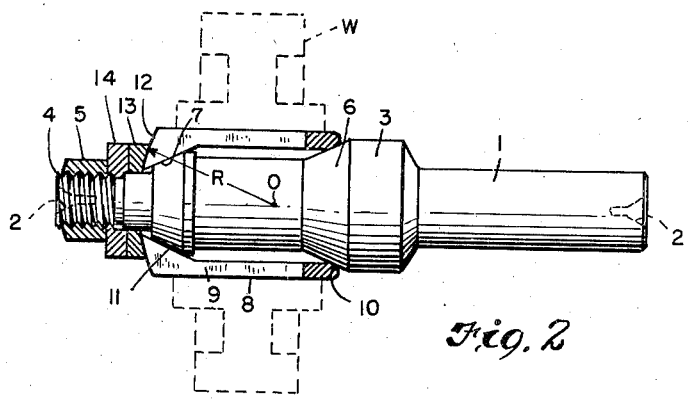
Fig. 2 is a view similar to Fig. 1, but partially shown in axial section, such section being substantially taken along line 2—2 of Fig. 1.
Figure 3:
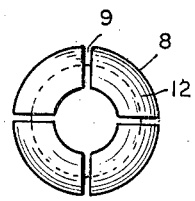
Fig. 3 is an end elevational view of the left-hand end of the expanding sleeve part of Figs. 1 and 2.
Figure 4:
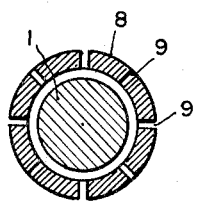
Fig. 4 is a transverse section taken substantially along line 4—4 of Fig. 1.
Figure 5:
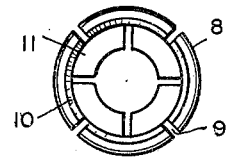
Fig. 5 is an elevational view of the right-hand end of the expanding sleeve part of Figs. 1 and 2.

A conical bearing surface 12 is provided on the left-hand or outer end of the expanding sleeve 8. As indicated in Fig. 2, the bearing surface 12 has a radius R whose center O is located upon the center line CL of the shank 1. A ring 13 has a concave conical surface which is complementary to and of the same radius as that of the conical surface 12. A second ring 14 has flat, radial sides which in turn form bearing surfaces with the nut 5 and the ring 13, respectively.

Thus, as the clamping nut 5 is turned up to exert a longitudinal pressure against the sleeve 8, such pressure, being transmitted through the conical bearing surface 12, tends to maintain the original axial alignment of the sleeve 8 on the shank 1. Any tendency of the sleeve 8 to move out of its proper axial alignment during such longitudinal compression is overcome and corrected by reason of the radial components of the longitudinal or axial forces exerted through the spherical bearing surface 12. In other words, since the center of the bearing surface 12 is coincident with the center line CL of the shank 1, the transmission of pressure against such surface always tends to maintain the latter, and the end of the sleeve 8, in true, axial alignment.

The spherical surface 12, together with the radial bearing surfaces formed by each side of the ring 14, also act as torsional absorbing means for preventing the transmission of twisting force from the nut 5 to the sleeve 8. Friction between two surfaces increases in proportion to the pressure forcing them together. Thus, the longitudinal pressure exerted by the nut 5 would ordinarily operate to transmit proportionately increased rotating or twisting force to a stationary member contacting it. However, this twisting force from the nut 5 is dissipated and absorbed by the multiple bearing surfaces provided by the rings 13 and 14, so that there is insufficient resultant twisting force or torsional effect to deform or distort the sleeve 8 during its expanding movement.

From the foregoing description, it will be seen that our invention provides means for obtaining an initial, highly accurate alignment of the expanding arbor parts, and maintaining this alignment, together with a uniform expansive movement, during the workpiece or tool gripping operation. This insures a highly accurate alignment of the workpiece or tool with respect to the axis of the arbor shank, thus eliminating any difficulties heretofore present in prior art structures and rendering possible the attainment of a higher degree of precision in mounting a workpiece or tool on an expanding arbor.

Other modes of applying the principle of the invention may be employed, change being made as regards the details described, provided the features stated in any of the following claims or the equivalent of such be employed.

We therefore particularly point out and distinctly claim as our invention:

1. An expanding arbor comprising the combination of a shank, an expansible sleeve of the collet type having alternately disposed slits extending inwardly from opposite sleeve ends, a nut threadably engaging said shank, a pair of ring members located between said nut and the end of said sleeve, a portion of a spherical bearing surface on one end of said sleeve contacting with a complementary portion of a spherical bearing surface on one side of one of said ring members, said other of said ring members having radial flat faces adapted to contact with said nut and with the outer face of said one of said ring members, said flat faces and said spherical bearing surfaces being adapted to absorb and prevent the transmission of twisting force from said nut to said collet, a conical bearing surface located adjacent each end of said sleeve, and a pair of complementary bearing surfaces on said shank and adapted to contact with said first-named conical bearing surfaces.

2. An expanding arbor comprising the combination of a shank, an expansible sleeve adapted to fit over said shank and to engage the interior of the workpiece, means for exerting longitudinal pressure on said sleeve, axially spaced conical bearing surfaces fixed on said shank, and complementary conical bearing surfaces on said sleeve, the apices of said conical bearing surfaces coinciding with the axis of said shank and being disposed in the same axial direction thereon with respect to the bases of each of said conical surfaces.

3. An expanding arbor comprising the combination of a shank, an expansible sleeve adapted to fit over said shank and to engage the interior of the workpiece, means for exerting longitudinal pressure on said sleeve, a conical bearing surface located adjacent each end of said sleeve, the bearing surface on one end of said sleeve being parallel to that on the other end of said sleeve, and a pair of complementary conical bearing surfaces fixed on said shank and adapted to contact with said first-named bearing surfaces.

4. An expanding arbor comprising the combination of a shank, an expansible sleeve adapted to fit over said shank and to engage the interior of the workpiece, means threadably engaging said shank for exerting longitudinal pressure on said sleeve, a bearing surface having the form of a portion of a sphere located between said means and one end of said sleeve, and axially spaced conical bearing surfaces between said shank and said sleeve, the apices of said conical bearing surfaces coinciding with the axis of said shank and being disposed in the same axial direction thereon with respect to the bases of each of said conical surfaces.

5. An expanding arbor comprising the combination of a shank, an expansible sleeve of the collet type having alternately disposed slits extending inwardly from opposite sleeve ends, a nut threadably engaging said shank for longitudinally compressing said sleeve, a bearing surface having the form of a portion of a sphere located between said nut and one end of said sleeve, a conical bearing surface located at each end of said sleeve, the bearing surface on one end of said sleeve being parallel to that on the other end of said sleeve, and a pair of complementary parallel bearing surfaces on said shank and adapted to contact said first-named conical bearing surfaces.

MILTON L. BENJAMIN.
STANLEY S. BENJAMIN.